Figure 1:
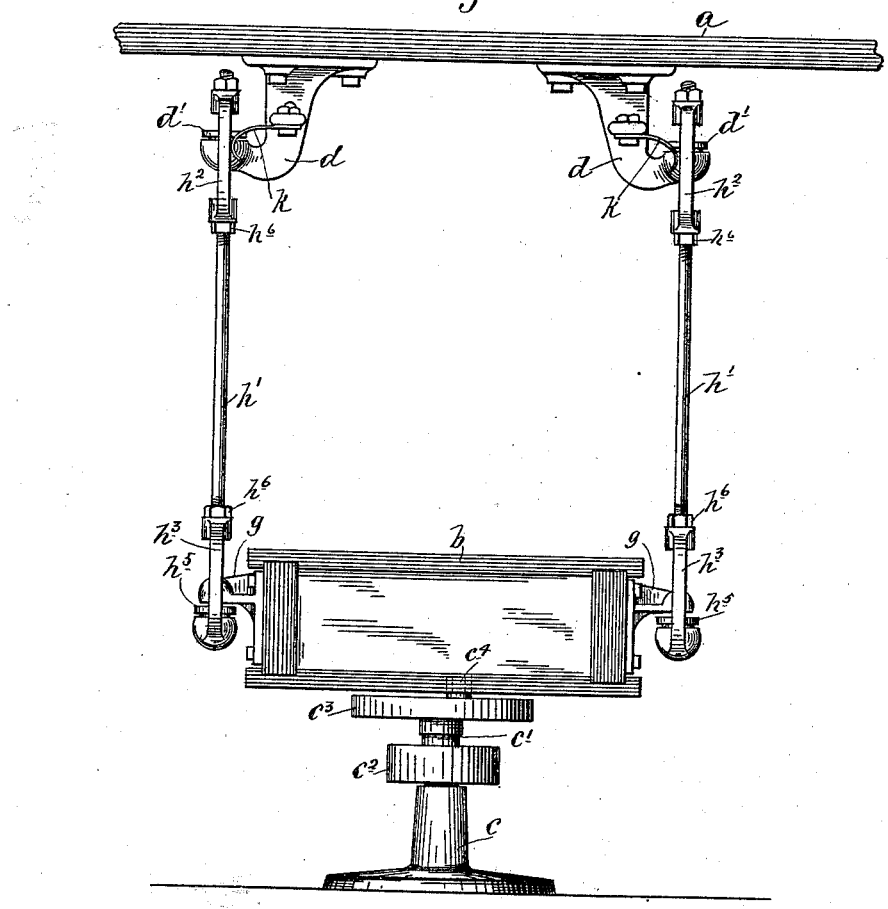

(No Model.)

J. WÖRNER.
BALL AND SOCKET HANGER FOR SIEVES, &c.

No. 545,931. Patented Sept. 10, 1895.

Witnesses.
a. H. Opsahl
Frank D. Merchant

Inventor.
Jacob Wörner
By his Attorney.
Jas. F. Williamson (No Model.) 2 Sheets—Sheet 2.
J. WÖRNER.
BALL AND SOCKET HANGER FOR SIEVES, &c.
No. 545,931. Patented Sept. 10, 1895.
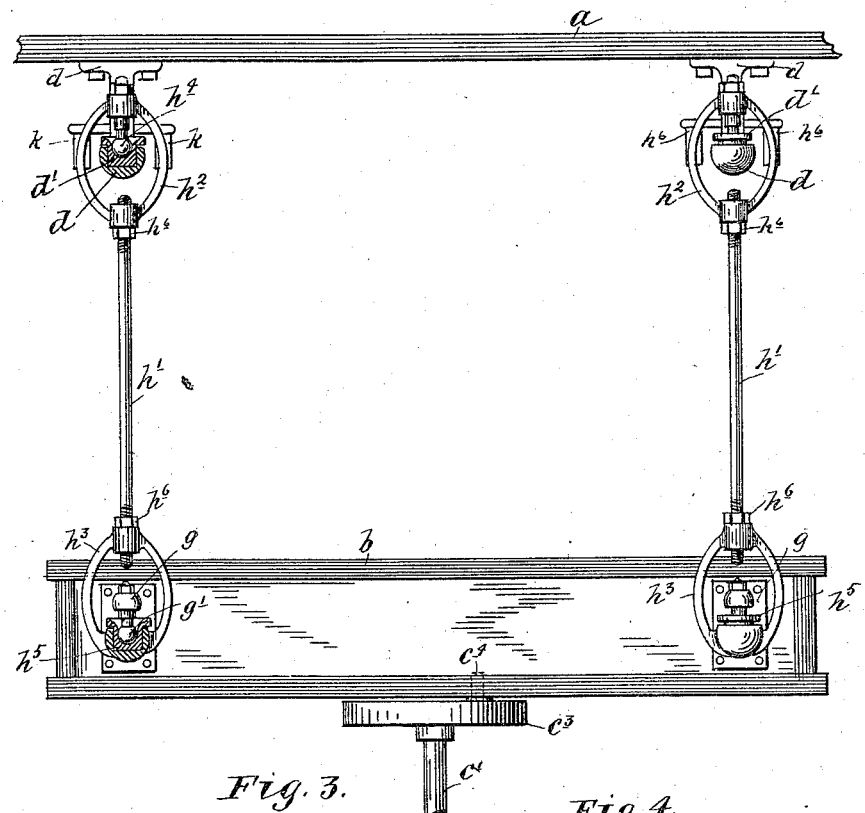
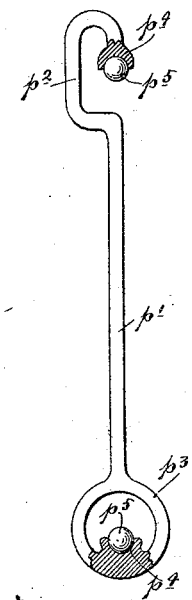
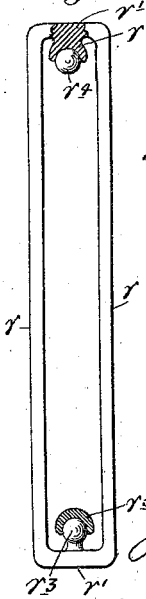
Witnesses
A. H. Opsahl.
Frank L. Merchant.
Inventor.
Jacob Wörner
By his Attorney
Jas. F. Williamson

UNITED STATES PATENT OFFICE.

JACOB WÖRNER, OF BUDA-PESTH, AUSTRIA-HUNGARY, ASSIGNOR TO CARL HAGGENMACHER, OF SAME PLACE.

BALL-AND-SOCKET HANGER FOR SIEVES, &c.

SPECIFICATION forming part of Letters Patent No. 545,931, dated September 10, 1895.

Application filed January 9, 1894. Serial No. 496,277. (No model.)

*To all whom it may concern:*

Be it known that I, JACOB WÖRNER, a citizen of Austria-Hungary, residing at Buda-Pesth, in the Empire of Austria-Hungary, have invented certain new and useful Improvements in Ball-and-Socket Hangers for Sieves, &c.; and I do hereby declare the following to be a full, clear, and exact description of the invention, such as will enable others skilled in the art to which it appertains to make and use the same.

My invention has for its object to provide an improved ball-and-socket hanger for suspending movable bodies. My improved hanger is especially adapted for suspending bodies which are to be given horizontal or substantially horizontal motion, and is particularly designed to meet the requirements for suspending sieves or chop-graders which are to be operated with a gyrating motion in the horizontal plane. In its especial application the invention is designed as an improvement in the form of hangers used for suspending chop-graders or sifters of the class described in United States Letters Patent issued to Carl Haggenmacher of date June 28, 1892, under Reissue No. 11,252, and generally known to the trade as the "Haggenmacher plansifters."

As may be seen by reference to the said patent or the machines in use, hangers for this class of work have hitherto been composed of a pair of socket-brackets extended in the direct line of strain and secured one to the overhead support and the other to the sifter or other movable body and a straight hanger-rod with ball ends or terminals extending in the direct line of strain and engaging with the said sockets to form ball-and-socket joints for suspending the sifter with freedom for the required motion. Hence with this prior construction the sockets were necessarily perforated or cut away at their central portions to permit the outward passage of the stem or body portion of the ball-carrying hanger-rod extending therefrom. The central or most efficient portions of the half-bearings in each joint were therefore rendered unavailable. The central portion of the socket had to be cut away not only enough to permit the outward passage of the rod, but sufficient to provide the necessary clearance for the pivotal or angular motion of the rod under the gyrating motion of the sieve, and the central portion of the ball member of each joint was occupied by the stem or body of the rod extending therefrom. Moreover, in view of the fact that the socket members had their central portions cut away, the joint was necessarily open and would not hold oil. It was therefore difficult to supply the necessary lubrication, and the attempt to do so involved a large waste of oil.

My invention overcomes the above-noted objections by providing a construction whereby I am able to utilize the central and most effective parts of both half-bearings, and in such a way in my preferred construction that the socket members become available as oil-cups for supplying abundant lubrication without waste. Briefly stated, I accomplish this result by extending the hanger-brackets and the terminal portions of the rod out of the direct line of strain, so that the full half-bearings may engage with each other throughout their entire surfaces in the direct line of strain, and by placing the sockets below at both the upper and the lower joints.

In the accompanying drawings I have illustrated my invention as applied to the gyrating sifters or chop-graders of the class above referred to, wherein—

Figure 1 is an end elevation showing my improved hangers as applied to one of the said sifters; and Fig. 2 is a side elevation of the same, with some parts shown in section and others broken away. Figs. 3 and 4 are detail views showing modified and comparatively undesirable forms of the hangers.

Like letters refer to like parts throughout.

Referring to Figs. 1 and 2, which illustrate the preferred form of my invention, $a$ represents a suitable overhead support, such as the ceiling or overhead beam in a building. $b$ represents the sifter or sieve-frame; $c$, a shaft pedestal or bearing; $c'$, a vertical driving-shaft mounted in said bearing and provided with a driving-pulley $c^2$ and a crank-disk $c^3$, having a crank-pin $c^4$, engaging with a suitable seat in the bottom of the sifter-frame for imparting a gyrating motion thereto. $d$ represents the upper hanger-brackets, curved or otherwise formed so as to project out of the direct line of strain on the hanger-rod and provided at their outer ends with removable sockets $d'$, enlarged at their upper portions to afford space for holding oil. The upper brackets are secured in any suitable way to the overhead support $a$. $g$ represents the lower hanger-brackets, secured in any suitable way to the sifter-frame and constructed of angular or other form, so as to project out of the direct line of strain on the hanger-rod, and provided at their outer ends with depending balls $g'$. $h'$ $h^2$ $h^3$ represent one of the hanger-rods, of which parts $h'$ represents the body portion or central section, and the parts $h^2$ $h^3$ represent, respectively, the upper and lower end or terminal sections of the rod. Of these parts the upper terminal section $h^2$ is curved or otherwise formed so as to project out of the direct line of strain on the rod and overreach the projecting or bearing part of the upper bracket $d$, and is provided at its upper end with a depending ball $h^4$, which engages from above with the socket $d'$, carried by the upper bracket $d$, and the lower terminal section $h^3$ is also curved or otherwise formed so as to project out of the direct line of strain on the rod and underreach the projecting or bearing part of the lower bracket $g$, and is provided at its lower end with a removable socket $h^5$, which engages from below with the depending ball $g'$, carried by said bracket $g$. This socket $h^5$ is exactly similar to the socket $d'$ and is enlarged at its upper end to form an oil-space. As shown, the terminal sections $h^2$ $h^3$ are in the form of open elliptical rings extending transversely to the brackets overreached and underreached thereby and have screw-threaded engagement with the central section $h'$ and may be secured thereon in any desired adjustment by jam-nuts $h^6$. These ring-like terminal sections $h^2$ $h^3$ are a convenient form of construction; but of course it will be understood that the same result might be secured in other ways. All that is essential in respect to the rod is that its terminal portions should be projected in some way out of the direct line of strain, so as to render the whole of the half-bearings carried thereby effective for bearing purposes, and that the upper terminals should carry a ball and the lower terminal a socket for co-operation, respectively, with a socket carried by the upper bracket $d$ and a ball carried by the lower bracket $g$, so as to render the sockets available as oil-cups. The sockets $d'$ and $h^5$ are constructed, as shown, in separate pieces removable from the respective parts by which they are carried for convenience in making and the ready substitution of new sockets when the old ones become worn. The screw-threaded engagement between the terminal sections $h^2$ $h^3$ and the body-section $h'$ of the rod affords a convenient means of shortening or lengthening the hanger-rod, as may be required.

With the construction above described it is obvious that the whole central surface of each half-bearing is rendered available for bearing-surfaces at each joint, and, in virtue of the underneath position of the socket member of each joint and the enlargement thereof, that an abundance of lubrication may always be supplied.

Springs $k$ are secured, as shown, to the opposite sides of the upper brackets $d$ and bear at their free ends against the inner vertical faces of the upper terminal sections $h^2$ of the hanger-rod and operate to prevent the hanger-rod from turning on its axis under the gyrating motion of the sifter. Of course the springs $k$ might be carried by the terminal section of the rod and bear against fixed lugs on the bracket, and it is equally obvious that the springs $k$ might be interposed between the lower terminal section $h^3$ of the rod and the lower bracket $g$, fixed to the sifter. All that is necessary is that a pair of said springs $k$ should be interposed at some point between the hanger-rod and the hanger-brackets to prevent the hanger-rod from turning on its axis.

Referring to the modifications, Fig. 3 shows a half reverse and Fig. 4 a full reverse, as compared with the form shown in Figs. 1 and 2, in respect to the relative locations of the half-bearings carried, respectively, by the brackets and the hanger-rods. In Fig. 3, for example, the rod $p'$ $p^2$ $p^3$ has sockets $p^4$ at both ends, and both of the brackets have balls $p^5$ for co-operation with said sockets $p^4$ on the rod, one from below and the other from above. The terminal sections $p^2$ $p^3$ are formed integral with the central section $p'$ of the rod, and the upper terminal section $p^2$ is made in the form of a hook for projecting out of the direct line of strain and overreaching the half-bearing of the upper bracket. This form would utilize the central portions of each half-bearing; but the upper joint would not hold oil, and the construction would therefore be less desirable.

In the form shown in Fig. 4 the rod is in the form of a longitudinally-extended open link with its parallel sides $r$ outside the direct line of strain and its terminal sections formed by the cross-bars or end portions $r'$ of the said link; and the rod thus formed carries a socket $r^2$ at its upper end and a ball $r^3$ at its lower end, engaging, respectively, the former with a ball $r^4$ on the upper bracket and the latter with a socket $r^5$ on the lower bracket. This form also utilizes the central bearing-surfaces of both half-bearings at each joint; but the socket members are above each joint, and hence neither joint will hold oil.

The forms shown in Figs. 3 and 4 are so much inferior to the forms shown in Figs. 1 and 2 that I do not recommend their use in practice. They are not the full mechanical equivalent of my preferred form for the reason that they will not hold oil. They have been shown more especially to illustrate different ways of projecting the terminal sections of the hanger-rod out of the direct line of strain.

By actual usage I have demonstrated the efficiency of my improved hanger in the form shown in Figs. 1 and 2.

What I claim, and desire to secure by Letters Patent of the United States, is as follows:

1. A hanger, for suspending a movable body, comprising an upper hanger-bracket securable to an overhead support, a lower hanger-bracket securable to the movable body, and a hanger-rod connected with both of said brackets by ball and socket joints, with both of said brackets and said rod projected out of the direct line of strain, to secure unbroken bearing surfaces, in the direct line of strain, at said ball and socket joints, substantially as described.

2. A hanger, for suspending a movable body, comprising a hanger-bracket and a hanger-rod connected with each other by a ball and socket joint, with the bracket and the rod both projected out of the direct line of strain, to secure unbroken bearing surfaces, in the direct line of strain, at said joint, and with the socket arranged to form the under member of said joint for holding oil, substantially as described.

3. A hanger, for movable bodies, comprising a hanger-bracket and a hanger-rod connected by a ball and socket joint, with both the bracket and the rod projected out of the direct line of strain, to secure unbroken bearing surfaces in the direct line of strain, at said joint, and with the socket half bearing arranged underneath the ball half bearing and enlarged to form an oil cup, substantially as described.

4. A hanger, comprising a socket bracket securable to the overhead support, a ball bracket securable to the suspended body, and a hanger rod having at its upper end a ball engaging the socket of the upper bracket and having, at its lower end, a socket engaging the ball of the lower bracket, with said brackets and said rod projected out of the direct line of strain, to secure unbroken bearing surfaces in the direct line of strain, at both of said joints, substantially as described.

5. A series of hangers, for suspending a movable body, comprising each a socket bracket securable to an overhead support, a ball bracket securable to said movable body, and a hanger-rod provided above with a ball engaging the socket of the upper bracket and provided below with a socket engaging the ball of the lower bracket, with said sockets enlarged to form oil cups, and both the brackets and the rod projected out of the direct line of strain, to secure unbroken bearing surfaces, in the direct line of strain, at said joints, substantially as described.

6. The combination with a hanger-rod and hanger-bracket, of springs interposed between the rod and the bracket to prevent the rod from turning on its axis.

7. The combination with the bracket $d$ secured to support $a$ and having the socket $d'$ and lower bracket $g$ secured to the movable body $b$ and having the ball $g'$, of the hanger rod $h'$ $h^2$ $h^3$, as described, having the ball $h^4$ engaging the socket $d'$ from above and having the socket $h^5$, engaging the ball $g'$ from below, and the pair of springs $k$ carried by the upper bracket $d$ and bearing against the inner faces of the rod section $h^2$, all substantially as described.

In testimony whereof I affix my signature in presence of two witnesses.

JACOB WÖRNER.

Witnesses:
H. GOTHLE,
WILLIAM MÁRIASSY.